United States Patent [19]

Takayama

[11] Patent Number: 5,715,083
[45] Date of Patent: Feb. 3, 1998

[54] SCREEN FOR LIQUID CRYSTAL PROJECTOR

[75] Inventor: Shigehiko Takayama, Hachiouji, Japan

[73] Assignee: Hitachi, Ltd., Tokyo, Japan

[21] Appl. No.: 461,522

[22] Filed: Jun. 5, 1995

[30] Foreign Application Priority Data

Jun. 27, 1994 [JP] Japan .................. 6-144332

[51] Int. Cl.$^6$ .................. G03H 1/26; G02B 5/32
[52] U.S. Cl. .................. 359/443
[58] Field of Search .................. 359/443, 452, 359/453, 454, 456, 459, 460

[56] References Cited

U.S. PATENT DOCUMENTS

| | | | |
|---|---|---|---|
| 5,011,244 | 4/1991 | Smith et al. | 350/3.75 |
| 5,135,300 | 8/1992 | Toide et al. | 353/31 |
| 5,187,597 | 2/1993 | Kato et al. | 359/22 |
| 5,347,644 | 9/1994 | Sedlmayr | 359/465 |

*Primary Examiner*—Daniel P. Malley
*Attorney, Agent, or Firm*—Antonelli, Terry, Stout, & Kraus, LLP

[57] ABSTRACT

A screen for a liquid crystal projector is provided on which an image formed by the output light from a liquid crystal projector can be recognized even in the presence of extraneous light. The screen is used for a color liquid crystal projector for projecting an image formed on a liquid crystal onto the screen by causing the light from a light source to be transmitted through or reflected from the liquid crystal. Lippman-type holograms (BS, GS, RS) having great reflectances with respect to only the wavelength band of output light of the liquid crystal projector are formed on the screen. As the screen reflects substantially only the output light of the liquid crystal projector and absorbs light having other wavelengths, the reflection of extraneous light is suppressed as much as possible. Therefore, the image projected by the liquid crystal projector is recognizable even in the presence of extraneous light.

14 Claims, 6 Drawing Sheets

SCREEN FOR LIQUID CRYSTAL PROJECTOR

BACKGROUND OF THE INVENTION

The present invention relates generally to a liquid crystal projector and more particularly to a screen for a liquid crystal projector that make it possible for an image formed by output light from the liquid crystal projector to be recognized even in the presence of extraneous light.

Conventional screens for liquid crystal projectors have made it necessary to intercept extraneous light because the luminance of the picture projected by the liquid crystal projector is low. In other words, light (extraneous light) other than that provided from the liquid crystal projector is reflected from the screen in a light room, and when its reflection luminance is greater than that of the output light from the liquid crystal projector, the projected image becomes unrecognizable. For this reason, it has been proposed to increase the reflectance of output light from a liquid crystal projector (gain improvement) by suppressing extraneous light as much as possible, by setting the reflection luminance of output light from the liquid crystal projector to be greater than that of outdoor light, by distributing glass beads on the surface of the screen, or by depositing aluminum thereon.

Even in the case of the aforementioned proposals, however, the image recognition ratio is low, since the reflectance of extraneous light also rises when the reflection of the extraneous light exists.

SUMMARY OF THE INVENTION

It is therefore an object of the present invention to provide a screen for a liquid crystal projector on which the image formed by the output light from liquid crystal projector can be recognized even in the presence of extraneous light.

In order to accomplish the foregoing object according to the present invention, a screen for a color liquid crystal projector, such as a liquid crystal projector for projecting an image formed on a liquid crystal by causing light from a light source to be transmitted through or reflected from the liquid crystal, comprises a layer for reflecting or scattering light having a specific wavelength band and for transmitting light having a wavelength band other than the specific one, and a light absorption layer. Moreover, a material having reflection, scattering and diffraction properties is provided on the screen by matching the properties of the material with the wavelength characteristics of the output light (R, G, B) from the color liquid crystal projector.

Since the output light of the liquid crystal projector is separated into the colors R, G, B, the reflection properties of the screen are formed in conformity with the respective wavelength band properties of the light. If light having a wavelength band other than those previously noted is prevented from being reflected, almost all of the extraneous light can be unreflected light.

DESCRIPTION OF THE PREFERRED EMBODIMENTS

Figure 1:
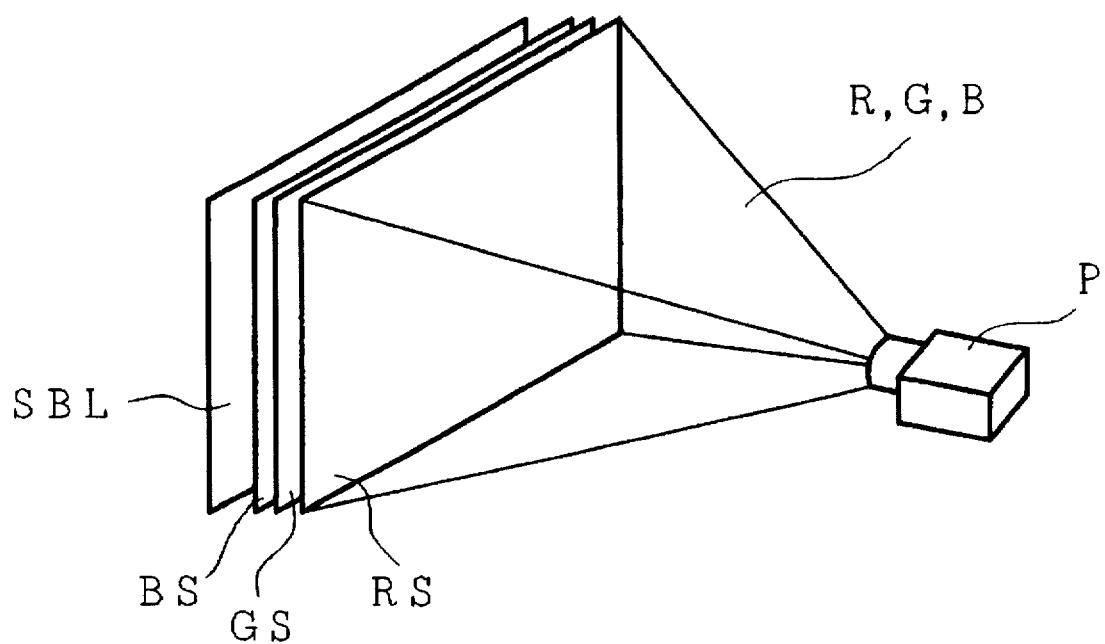
FIG. 1 is a configuration diagram of a screen for a liquid crystal projector according to the present invention.

Referring to the drawings, an embodiment of the present invention will be described. FIG. 1 is a diagram of a screen for a liquid crystal projector according to the present invention. In FIG. 1, RS, GS, BS each represent hologram layers; SBL represents a light absorption layer; P designates a liquid crystal projector; and R, G, B designates output light of respective colors from the liquid crystal projector P.

Figure 2:
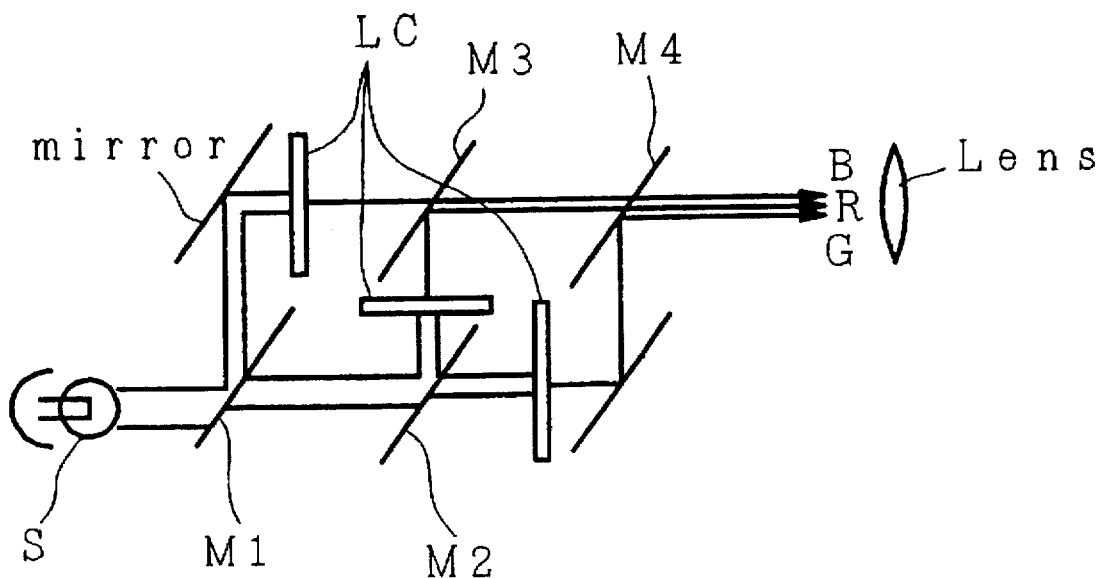
FIGS. 2(a) and 2(b) illustrate the structure of a three-plate type liquid crystal projector and that of a single-plate type liquid crystal projector respectively.
Figure 2:
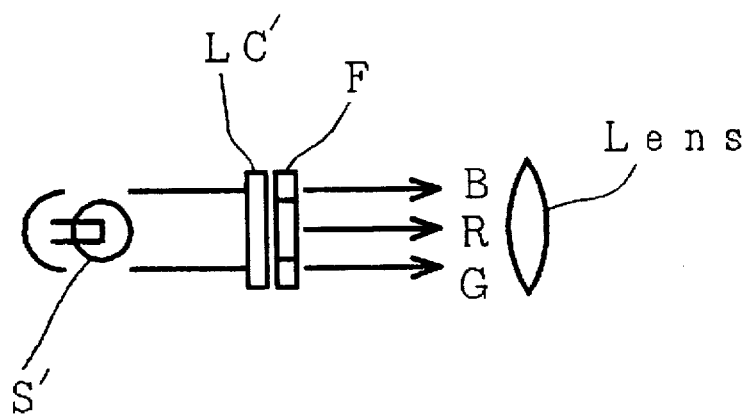
Figure 3:
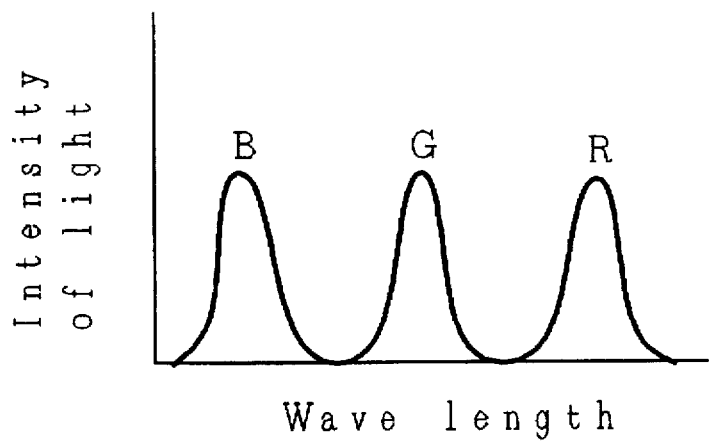
FIG. 3 is a diagram illustrating the wavelength characteristics of output light of the liquid crystal projector.

When the liquid crystal projector P is a three-plate type, as shown in FIG. 2(a), light from a light source S is first transmitted through dichroic mirrors M1, M2, M3, M4 for color separation into light beams of three primary colors (red, green, blue), and they are transmitted through liquid crystal panels LC, so that the output light beams R, G, B from the liquid crystal projector are formed. When a liquid crystal projector P is of a single-plate, as shown in FIG. 2(b), on the other hand, light from a light source S' is transmitted through a liquid crystal panel LC' and a color filter F for color separation to form output light beams R, G, B from the liquid crystal projector. FIG. 3 shows the wavelength characteristics of the output light beams R, G, B from the liquid crystal projector. Lippmann type hologram layers RS, GS, BS are formed on the surface of the screen for the liquid crystal projector of FIG. 1 in conformity with the wavelength characteristics.

Figure 4:
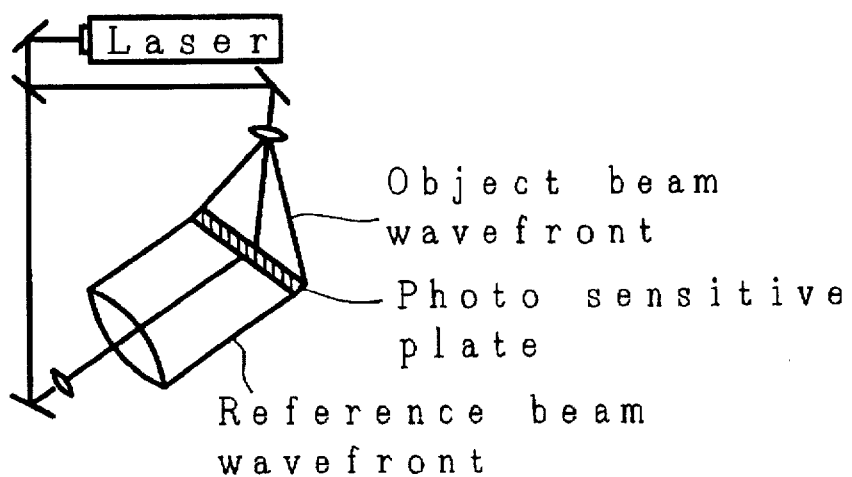
FIG. 4 is a diagram illustrating the preparation of a Lippmann type hologram.

The Lippmann type hologram is, as shown in FIG. 4, a hologram which is produced by causing the object beam wavefront and reference beam wavefront to fall onto a hologram recording layer from opposite directions. For recording the hologram, a photosensitive plate produced by applying a photosensitive material to a thickness of over several microns onto the plate, the photosensitive material exhibiting less absorption of light and a resolving power of several thousands of lines/mm or higher. The photosensitive material is allowed to have a distribution of periodic refractive indexes of over tens of layers through adequate exposure to light and development. The periodic refractive index serves as a kind of multilayer interference filter having a great reflectance for a certain specific wavelength band (wavelength selectivity). The wavelength band having such a great reflectance can be made to match the wavelength bands of the output light beams R, G, B from the liquid crystal projector by selecting the wavelength of a laser beam.

Figure 5:
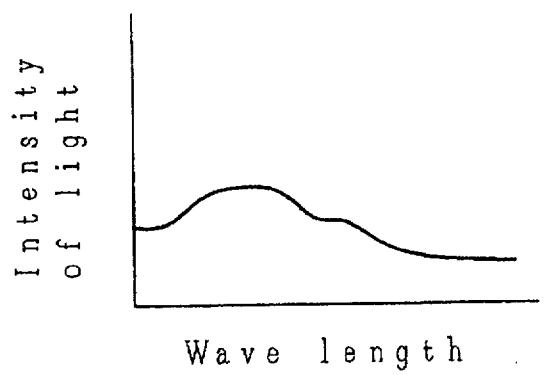
FIG. 5 is a diagram illustrating the wavelength characteristics of extraneous light.
Figure 6A:
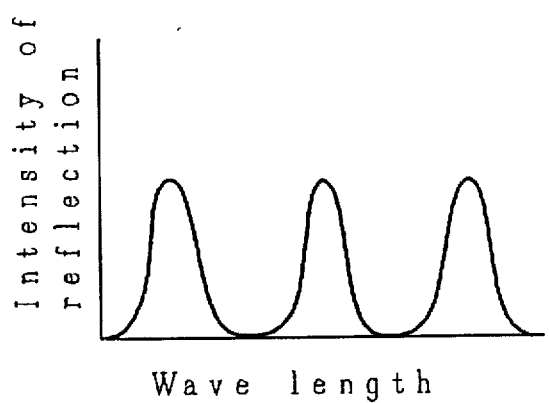
FIGS. 6(a) and 6(b) are diagrams illustrating the reflection properties of a screen according to the present invention.
Figure 6B:
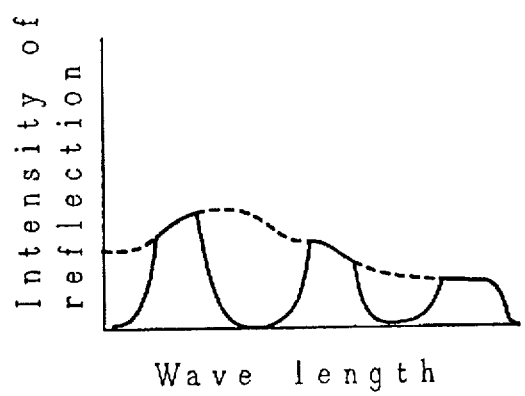

More specifically, RS reflects and diffracts only light having a wavelength of R, and transmits the other light having all other wavelengths. GS reflects and diffracts light having a wavelength of G, and transmits the other light having all other wavelengths. BS reflects and diffracts light having a wavelength of B, and transmits the other light having all other wavelengths. On the other hand, the wavelength characteristics of extraneous light is as shown in FIG. 5 when the extraneous light is daylight. Consequently, the output light of the liquid crystal projector is totally reflected from the screen according to the present invention, as shown in FIG. 6(b). The extraneous light is absorbed by the light absorption layer SBL which is provided on the back of the screen and is used to reflect only light having a specific wavelength band, but not to reflect the other light. In other words, the contrast of the image formed on the screen by the liquid crystal projector is improved, since the reflection of the extraneous light can be largely restrained in comparison with conventional screens. A bright image is also obtainable thereby.

Figure 7:
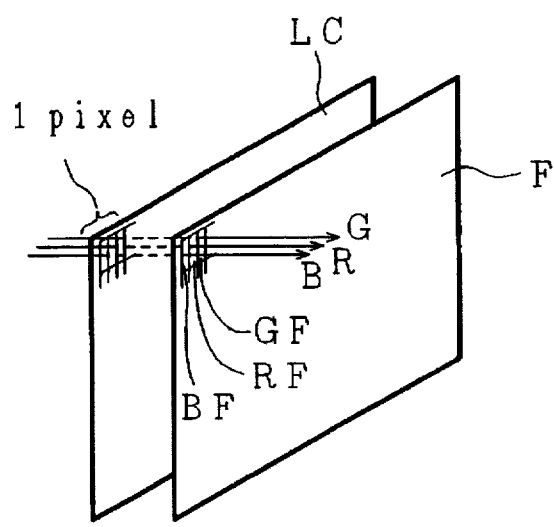
FIG. 7 is a diagram illustrating the relation between the liquid crystal panel and color filter of a single-plate type liquid crystal projector.
Figure 8:
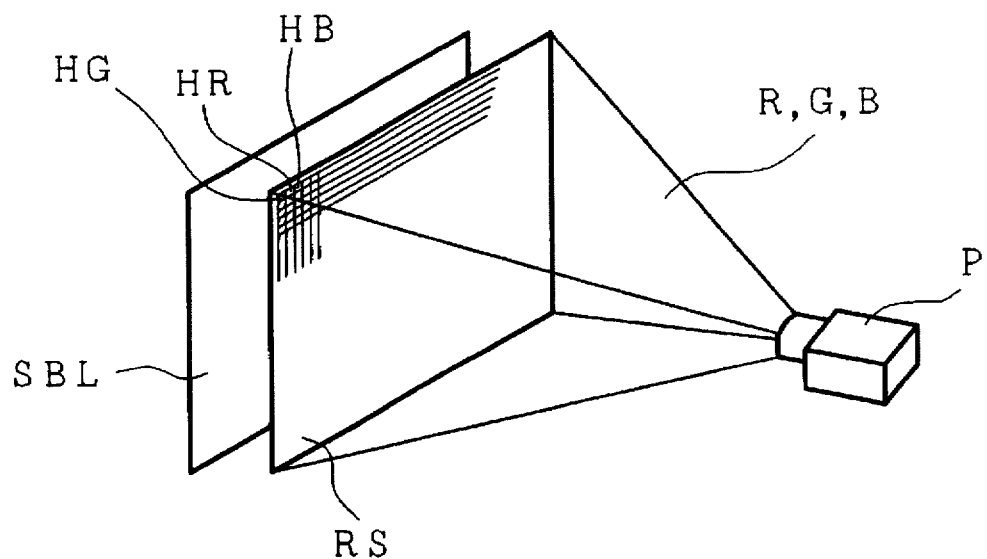
FIG. 8 is a diagram illustrating another single-plate type liquid crystal projector embodying the present invention.

Further, in the case of the single-plate type liquid crystal projector, color elements RF, GF, BF of the color filter F correspond to the respective three dots of one pixel of the liquid crystal panel LC, as shown in FIG. 7, so as to form the output colors R, G, B; consequently, even a hologram pattern corresponding thereto may be formed on the screen. FIG. 8 illustrates the structure of this sort, as described above, in which hologram elements HR, HG, HB corresponding to the color element pattern of the color filter are formed. As the output light beams R, G, B are respectively projected on the elements HR, HG, HB, only the output light having a wavelength band to be reflected strikes each element. Accordingly, light can be reflected with an efficiency greater than that of the three-plate type liquid crystal projector. Needless to say, a similar effect is obtainable even though the screen of FIG. 1 is employed when the single-plate liquid crystal projector is used.

Figure 9:
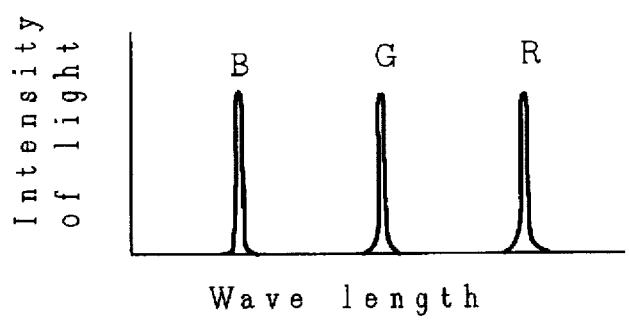
FIGS. 9(a)–9(c) show diagrams illustrating the effect of the screen according to the present invention when the wavelength characteristics of output light of the liquid crystal projector are varied.
Figure 9:
Figure 9:
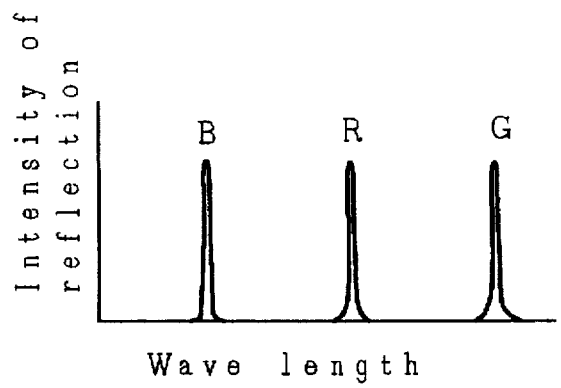
Figure 9:
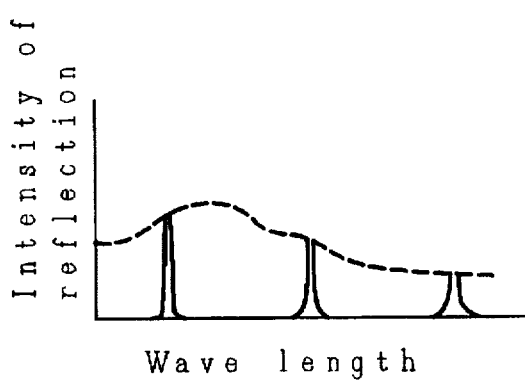

As set forth above, when the wavelength characteristics of the output light from the liquid crystal projector are made narrow and high (e.g., monochromatic light as provided by a laser beam) as shown in FIG. 9, by matching the wavelength characteristics with hologram characteristics on the screen, only the output light from the liquid crystal projector can almost be reflected upon the screen. Obviously, the effect of the invention is thus heightened.

Although a description has been given of a so-called transmission type liquid crystal projector using light transmitted through a liquid crystal panel as output light, an effect similar to the above case is obviously achievable by the screen according to the present invention even in the case of a reflection liquid crystal projector designed to direct light to a liquid crystal panel so as to project the light reflected therefrom as output light.

By use of the screen according to the present invention, the reflection of extraneous light is thus restrained greatly and almost only the output light from the liquid crystal projector is reflected, so that a clear bright image is obtainable by the liquid crystal projector.

What is claimed is:

1. A screen for a color liquid crystal projector for projecting an image formed on a liquid crystal onto the screen by causing light from a light source to be transmitted through or reflected from the liquid crystal, the screen comprising:
   a layer for reflecting or scattering light having a specific wavelength band and for transmitting other light having wavelengths other than the specific wavelength band; and
   a light absorption layer for absorbing light not reflected or scattered by said layer.

2. A screen for a color liquid crystal projected for projecting an image formed on a liquid crystal onto the screen by causing light from a light source to be transmitted through or reflected from the liquid crystal, the screen comprising:
   a layer for reflecting or scattering light having specific wavelength bands matched with wavelength bands of output light from the color liquid crystal projector and for transmitting other light having wavelengths other than the specific wavelength bands; and
   a light absorption layer.

3. A screen for a liquid crystal projector as claimed in claim 1, wherein the specific wavelength band of light reflected or scattered by the screen is made narrower than the wavelength band of the output light from color liquid crystal projector by matching the output light with the reflected or scattered light.

4. A screen for a liquid crystal projector as claimed in claim 1, wherein a multilayer-film interference filter having reflection, scattering and diffraction characteristics is provided on the screen and in which the characteristics of the multilayer-fill interference filter are matched with wavelength characteristics of output light from the color liquid crystal projector.

5. A screen for a liquid crystal projector as claimed in claim 1, wherein a hologram recording layer interference filter having reflection, scattering and diffraction properties is provided on the screen, in which the properties of the hologram recording layer are matched with wavelength characteristics of output light from the color liquid crystal projector.

6. A screen for a liquid crystal projector as claimed in claim 5, wherein the hologram recording layer is formed by exposing a photosensitive material to a laser beam.

7. An apparatus comprising:
   a screen for a liquid crystal projector for projecting an image formed on a liquid crystal onto the screen by causing light from a light source to be transmitted through or reflected from the liquid crystal, the screen including a layer for reflecting or scattering light having a specific wavelength band and for transmitting other light having wavelengths other than the specific wavelength band, and a light absorption layer for absorbing light not reflected or scattered by said layer; and
   a liquid crystal projector;
   wherein the liquid crystal projector projects output light onto the screen in the presence of extraneous light, the layer of the screen being a layer for transmitting the extraneous light having a wavelength other than the specific wavelength band therethrough, and the light absorption layer absorbing the transmitted light so as to repress reflection of the extraneous light, whereby the image projected by the liquid crystal projector is recognizable even in the presence of the extraneous light.

8. A screen for a liquid crystal projector as claimed in claim 1, wherein output light from the liquid crystal projector is separated into red, green and blue light, and wherein the layer of the screen comprises respective layers for reflecting or scattering light having a specific wavelength band for the respective red, green or blue color and for transmitting other light having a wavelength other than the respective specific wavelength band for the red, green or blue color therethrough, and the light absorption layer of the screen absorbing the light of wavelengths transmitted through the respective layers and not subsequently reflected therefrom.

9. A screen for a color liquid crystal projector as claimed in claim 1, wherein the layer extends over substantially the entire surface of the screen.

10. A screen for a color liquid crystal projector as claimed in claim 1, wherein the layer uniformly reflects or scatters light having the specific wavelength band and transmits other light having wavelengths other than the specific wavelength band, the light absorption layer absorbing light having the wavelengths other than the specific wavelength band not reflected or scattered by said layer.

11. A screen for a color liquid crystal projector as claimed in claim 2, wherein the layer extends over substantially the entire surface of the screen.

12. A screen for a color liquid crystal projector as claimed in claim 2, wherein the layer uniformly reflects or scatters light having the specific wavelength band and transmits other light having wavelengths other than the specific wavelength band, the light absorption layer absorbing light having the wavelengths other than the specific wavelength band not reflected or scattered by said layer.

13. An apparatus as claimed in claim 7, wherein the layer extends over substantially the entire surface of the screen.

14. An apparatus as claimed in claim 7, wherein the layer uniformly reflects or scatters light having the specific wavelength band and transmits other light having wavelengths other than the specific wavelength band, the light absorption layer absorbing light having the wavelengths other than the specific wavelength band not reflected or scattered by said layer.

* * * * *